US012804209B2

(12) United States Patent
Arbel

(10) Patent No.: US 12,804,209 B2
(45) Date of Patent: Nov. 17, 2026

(54) VIDEO DELIVERY VIA IMAGE STREAM

(71) Applicant: SYNCED APPS TECHNOLOGIES LTD, Ramat Gan (IL)

(72) Inventor: Itai Arbel, Tel Aviv (IL)

(73) Assignee: SYNCED APPS TECHNOLOGIES LTD, Ramat Gan (IL)

( * ) Notice: Subject to any disclaimer, the term of this patent is extended or adjusted under 35 U.S.C. 154(b) by 192 days.

(21) Appl. No.: 18/953,130

(22) Filed: Nov. 20, 2024

(65) Prior Publication Data

US 2025/0193464 A1 Jun. 12, 2025

Related U.S. Application Data

(60) Provisional application No. 63/606,609, filed on Dec. 6, 2023.

(51) Int. Cl.

| | |
|---|---|
| ***G06F 15/16*** | (2006.01) |
| ***H04N 7/01*** | (2006.01) |
| ***H04N 19/40*** | (2014.01) |
| ***H04N 21/2343*** | (2011.01) |

(52) U.S. Cl.

CPC ....... *H04N 21/2343* (2013.01); *H04N 7/0102* (2013.01); *H04N 19/40* (2014.11)

(58) Field of Classification Search

CPC ... H04N 7/0102; H04N 19/40; H04N 21/2343
USPC .......................................................... 709/231
See application file for complete search history.

(56) References Cited

U.S. PATENT DOCUMENTS

| | | | | |
|---|---|---|---|---|
| 8,762,545 B2 * | 6/2014 | Li | H04L 67/565 709/227 |
| 9,124,926 B2 * | 9/2015 | Fujimoto | H04N 21/43615 |
| 9,160,964 B2 * | 10/2015 | Yuan | H04N 21/41407 |
| 9,418,618 B2 * | 8/2016 | Zhang | H04N 5/268 |
| 10,110,957 B2 * | 10/2018 | Seo | H04N 21/4332 |
| 10,171,847 B2 * | 1/2019 | Imoto | G11B 27/031 |
| 10,171,875 B2 * | 1/2019 | Seo | G06F 3/0482 |
| 10,375,140 B2 * | 8/2019 | Ko | H04L 1/0014 |
| 10,958,983 B1 * | 3/2021 | Soffer | G09G 5/006 |
| 10,972,787 B2 * | 4/2021 | Nishi | G06T 5/92 |
| 11,119,721 B1 * | 9/2021 | Harris | G06F 3/1423 |
| 11,323,770 B2 * | 5/2022 | Nishi | G06T 5/92 |
| 11,750,785 B2 * | 9/2023 | Yuan | H04N 23/86 386/304 |

(Continued)

*Primary Examiner* — Moustafa M Meky
(74) *Attorney, Agent, or Firm* — AlphaPatent Associates Ltd.; Daniel J. Swirsky

(57) ABSTRACT

A computer-implemented system for seamless content delivery to an appliance equipped with a screen includes at least one memory, one processor communicatively coupled to the memory and a seamless content delivery system (SCDS), operated by the processor. The SCDS is configured to receive a request to play a video on the screen, the video stored in a first format that the appliance cannot display, restructure the video into a second format supported by the appliance, and play the video in the second format on the screen. A computer-implemented method for seamless content delivery to an appliance equipped with a screen includes receiving a request to play a video on the appliance, the video stored in a first format that the appliance cannot play, restructuring the video into a second format that the appliance can play, and playing the video in the second format on the appliance.

12 Claims, 4 Drawing Sheets

(56) References Cited

U.S. PATENT DOCUMENTS

| | | | | |
|---|---|---|---|---|
| 11,871,077 | B2 * | 1/2024 | Nishi | G06T 5/92 |
| 12,206,938 | B2 * | 1/2025 | Nishi | G06T 5/92 |
| 12,567,133 | B2 * | 3/2026 | Yu | G06T 5/92 |
| 2012/0303834 | A1 * | 11/2012 | Adam | H04N 21/6408<br>709/231 |
| 2012/0324511 | A1 * | 12/2012 | Koh | H04H 60/06<br>725/39 |
| 2016/0035313 | A1 * | 2/2016 | Zhang | H04N 21/43632<br>348/474 |
| 2017/0054937 | A1 * | 2/2017 | Liu | H04N 21/43632 |
| 2017/0055028 | A1 * | 2/2017 | Liu | H04N 21/43635 |
| 2017/0171568 | A1 * | 6/2017 | Liu | H04L 61/4511 |
| 2021/0092342 | A1 * | 3/2021 | Yuan | H04N 23/86 |
| 2022/0248101 | A1 * | 8/2022 | Lindholm | G06F 3/04842 |
| 2025/0233961 | A1 * | 7/2025 | Zhu | H04N 13/268 |
| 2025/0365390 | A1 * | 11/2025 | Liu | H04N 21/43635 |

* cited by examiner

VIDEO DELIVERY VIA IMAGE STREAM

FIELD

The invention relates to the field of video delivery in general, and in particular to using image streams to display video.

BACKGROUND

Content is primarily delivered to appliances such as smart televisions via the internet utilizing Wi-Fi or Ethernet communication channels. The content is processed and displayed through various built-in streaming apps and services. Many appliances such as Smart TVs, mobile, web, consoles and the like, are equipped with operating systems that support a range of streaming platforms (such as Netflix, Hulu, Amazon Prime Video and YouTube) allowing streaming video content (e.g., MP4 or MOV formats) directly over-the-top (OTT) to the TV.

Different appliances offer varying levels of content delivery capabilities. Some devices or applications may lack support for standard video playback formats. Additionally, features like simultaneous streaming of two video files may be limited to specific apps that support Multi-View and/or Picture-in-Picture (PiP) functionality and displaying transparent animations, such as those using the GIF format, might be restricted on certain clients.

SUMMARY

There is provided in accordance with an embodiment of the invention a computer-implemented system for seamless content delivery to an appliance equipped with a screen, the system includes at least one memory, one processor communicatively coupled to the memory and a seamless content delivery system (SCDS), operated by the processor. The SCDS is configured to receive a request to play a video on the screen, the video stored in a first format that the appliance cannot display, restructure the video into a second format supported by the appliance, and play the video in the second format on the screen.

Additionally, in accordance with an embodiment of the invention, the system further includes a content display module configured to receive the request to play the video in the first format and play the video in the second format, and a content restructuring module configured to create the second format.

Moreover, in accordance with an embodiment of the invention, the first format is a file stored in any standard video playback format and the second format includes several images and a metadata file, where each image is a frame of the video, and the metadata file includes information related to the images and to some quality parameters.

Furthermore, in accordance with an embodiment of the invention, the set of quality parameters consists of the following parameters: a number of images; location of the images; resolution; frames per second (FPS); bitrate; codec; audio parameters; length; duration; aspect ratio; and color depth.

Still further, in accordance with an embodiment of the invention, the content display module further includes a trigger handler configured to receive the request to play the video, a capabilities handler configured to check the ability of the appliance to directly play the video, a content retrieval handler configured to retrieve the second format of the video, and a content display handler configured to play the second format of the video at a required rate on the screen.

Additionally, in accordance with an embodiment of the invention, the content restructuring module further includes a request handler configured to receive a request to provide the second format for the video, a rearrangement handler configured to decode the video and create image files from frames of the video, and a metadata handler configured to update the metadata file with details on the percentage of the images created related to the total number required.

Moreover, in accordance with an embodiment of the invention, the rearrangement handler is configured to split the video into a variable number of variable sized initial segments and concurrently on all segments extract each frame in the segment and convert the extracted frame into an image with a predefined resolution and a predefined file format.

Furthermore, in accordance with an embodiment of the invention, the trigger is activated by a manual event or an automatic event, where the manual event is any of the following events: pausing a playback and changing a channel; and the automatic event is any of the following events: start playing the video; stop playing the video; and specific time elapsed from the beginning of the playback.

There is provided in accordance with an embodiment of the invention a computer-implemented method for seamless content delivery to an appliance equipped with a screen. The method includes receiving a request to play a video on the appliance, the video stored in a first format that the appliance cannot play, restructuring the video into a second format that the appliance can play, and playing the video in the second format on the appliance.

Additionally, in accordance with an embodiment of the invention, the first format is a file stored in any standard video playback format and the second format includes images and a metadata file, where each image is a frame of the video, and the metadata file includes information related to the images and a set of quality parameters.

Moreover, in accordance with an embodiment of the invention, the set of quality parameters includes any of the following parameters: a number of images; location of the images; resolution; frames per second (FPS); bitrate; codec; audio parameters; length; duration; aspect ratio; and color depth.

Furthermore, in accordance with an embodiment of the invention, the method further includes checking the ability of the appliance and if the appliance cannot play the video in the first format retrieving the second format of the video and playing the second format of the video on the screen according to the quality parameters.

Still further, in accordance with an embodiment of the invention, the restructuring step further includes creating image files from frames of the video and continuously updating the metadata file with details on the percentage of the images created out of the total number of frames in the video.

Additionally, in accordance with an embodiment of the invention, the step of creating image files further includes splitting the video into a variable number of variable sized initial segments, and concurrently on all segments, extract each frame in the segment and convert the extracted frame into an image with a predefined resolution and a predefined file format.

Moreover, in accordance with an embodiment of the invention, the trigger is activated by a manual event or an automatic event, where the manual event is any of the following events: pausing a playback and changing a channel, and the automatic event is any of the following events: start playing; stop playing; and specific time elapsed from the beginning of the playback.

BRIEF DESCRIPTION OF THE DRAWINGS

The invention will now be described in relation to certain examples and embodiments thereof with reference to the following illustrative drawing figures so that it may be more fully understood. In the drawings.

Figure 1:
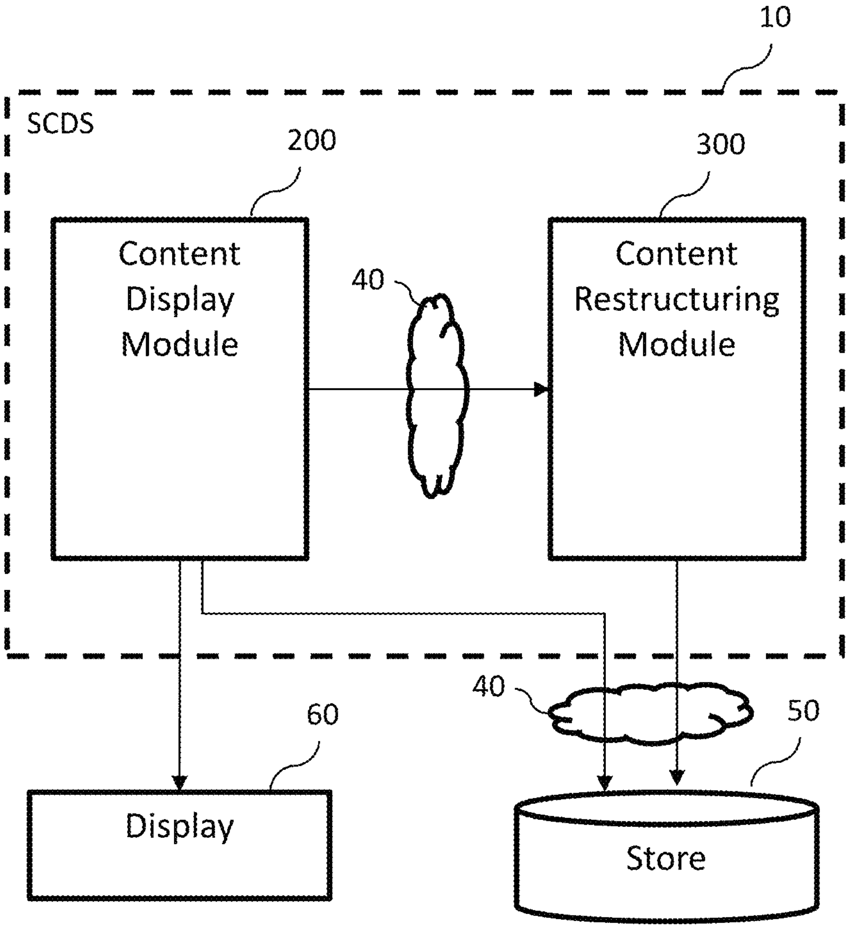
FIG. 1 is a schematic illustration of a seamless content delivery system (SCDS) 10, constructed and operative in accordance with an embodiment of the present invention.

It will be appreciated that for simplicity and clarity of illustration, elements shown in the drawing figures have not necessarily been drawn to scale. For example, the dimensions of some of the elements may be exaggerated relative to other elements for clarity. Further, where considered appropriate, reference numerals may be repeated among the drawing figures to indicate the same or analogous elements.

DETAILED DESCRIPTION

In the following description, various aspects of the invention will be described. For purposes of explanation, specific configurations and details are set forth in order to provide a thorough understanding of the invention. However, it will also be apparent to one skilled in the art that the invention may be practiced without the specific details presented herein. Furthermore, well known features may be omitted or simplified in order not to obscure the invention.

The growing diversity of appliances equipped with screens (displays) such as smart TV, mobile, web, consoles and the like, each supporting a different set of capabilities, requires a content delivery approach that ensures accessibility and usability across all platforms. Embodiments of the present invention provide systems and methods than enable delivering content in a format optimised for seamless delivery, even when either the appliance equipped with the screen, or the application running on the appliance lacks support for the content in question (e.g., lack support for playing standard video formats such as MP4 or MOV, lack support for displaying multiple MP4 files or transparent animation and the like).

FIG. 1, to which reference is now made, is a schematic illustration of a seamless content delivery system (SCDS) 10, constructed and operative in accordance with an embodiment of the present invention. SCDS 10 may restructure the content from its original form (e.g., MP4) to a new restructured form (e.g., individual images, image for each frame).

SCDS 10 comprises a content display module 200, and a content restructuring module 300. Content display module 200 may be installed on an appliance (e.g., smart TV) equipped with a display 60 and may receive a request to display specific content. The request may be sent by a user interacting with the appliance or by an application running on the appliance. The requested content may be a film, a video, an advertisement, a pole and the like. When content display module 200 cannot display the content as-is, it may ask content restructuring module 300 to restructure the original content to a format that can be played on the appliance.

It may be noted that content display module 200 and content restructuring module 300 may be installed on different systems and may communicate over cloud 40. The original content and its restructured form may be stored in store 50, optionally installed on a system over cloud 40. It may be noted that communication between display module 200, content restructuring module 300 and store 50 may utilize any available communication protocol (e.g., ethernet, Wi-Fi).

The content may be a video file in any known video file format including MP4 and MOV. The restructured form of the content may include a set of images, an image for each frame in the video, and a metadata file containing information related to the new structure. The information in the metadata file may include the number of images, the location of the images, quality parameters and the like.

The format of the images may be any known image file format including JPEG (Joint Photographic Experts Group), PNG (Portable Network Graphics), GIF (Graphics Interchange Format), SVG (Scalable Vector Graphic), BMP (Bitmap), TIFF (Tagged Image File Format), web-optimized images (WebP) and the like.

Store 50 may be any type of store capable of storing files, including private stores and stores provided over the cloud by any type of provider. Store 50 may be distributed, and the original content may be stored in a different location than its restructured form.

Figure 2:
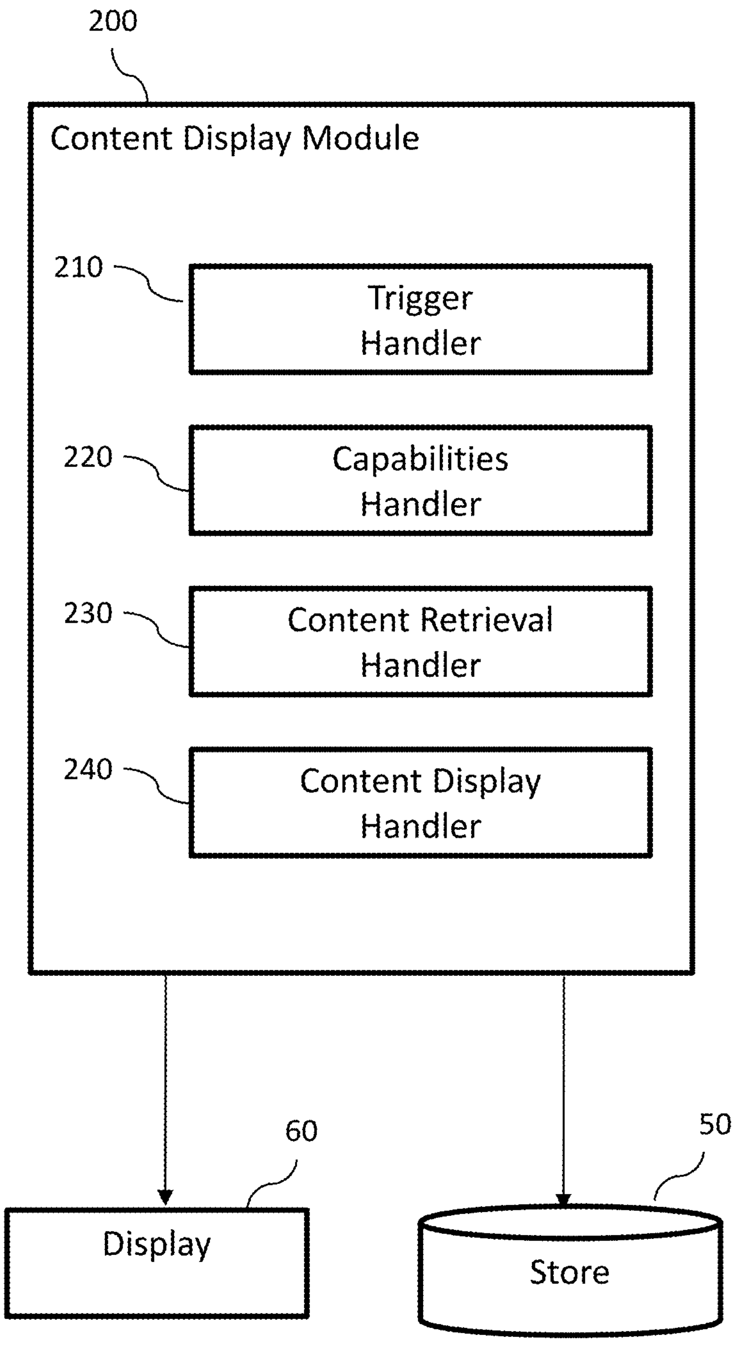
FIG. 2 is a schematic illustration of the content display module of the SCDS, constructed and operative in accordance with an embodiment of the present invention.

FIG. 2, to which reference is now made, is a schematic illustration of content display module 200 constructed and operative in accordance with an embodiment of the present invention. Content display module 200 comprises a trigger handler 210; a capability handler 220; a content retrieval handler 230 and a content display handler 240.

Trigger handler 210 may handle requests to display a specific video file. The requests may be triggered by many types of events. The events may be initiated manually by a user of the appliance or automatically by an application. The request may be manually initiated, for example by an operation on a remote control, when the user of the appliance selects an item in a menu on display 60. The request may be automatically initiated by an application configured to send a request to play specific content at specific times during a playback of a video (e.g., after 5 minutes from the beginning of the playback), or when a user of the appliance operates the remote control to perform an operation configured in the application to activate a playback (e.g., display an ad when the user pauses the current video or when the user changes a channel).

Capability Handler 220 may check the ability of the device to directly play the requested content, and the ability of the network to fetch it if the content is located over the cloud. Capability handler 220 may check the device hardware capabilities and properties (available memory, resolution: SD/HD/Full HD), the network bandwidth and the current state of the application to determine if the device is capable of instantly playing the requested content (i.e., in its current format). Capability handler 220 may check for example, whether the device supports playing content stored in MP4 file format or whether the device is already playing an MP4 device when receiving a request to play an additional MP4 file and the like.

If the content cannot be displayed in its original format, capability handler 220 may determine some required quality parameters (e.g., resolution, FPS and the like) the restructured form of the content should meet.

Content retrieval handler 230 may create a request asking for the specific content along with the required quality parameters and send it to content restructuring module 300. If an immediate response is not received, (the restructured content is not ready) content retrieval handler 230 may wait for a preconfigured duration before resending the request. Eventually, content retrieval handler 230 may receive a response providing information related to the restructured form of the content and its location.

Both the request and the response may include a location and a set of parameters including quality settings that the restructured form must meet. The quality setting may include any combination of parameters such as FPS, resolution, bitrate, codec, audio parameters, length, duration, aspect ratio, color depth and the like.

The information related to the location of the data in the request may include a URL of the original content file in store 50 in the request and information related to the created images in the response.

Content retrieval handler 230 may parse the response and may first retrieve a metadata file describing the restructured form of the video along with parameters necessary for the proper operation of SCDS 10. These parameters (e.g., the number of the images in the restructured form) may facilitate correct downloading and streaming of the images in the appropriate sequence and rate enabling the video to play smoothly while simulating the behavior of a device capable of handling the original video.

After preloading a configurable percentage of the images, (e.g., 20% of the images) content retrieval handler 230 may activate content display handler 240 to start rendering the retrieved images while continuing to load the remaining images until the last one.

Content display handler 240 may wait for the first set of images and after the first set is completely downloaded, display the fetched images one after the other in the appropriate sequence and rate on display 50. Content display handler 240 may skip images to meet the needed FPS if the number of images exceeds the FPS supported by the appliance.

Figure 3:
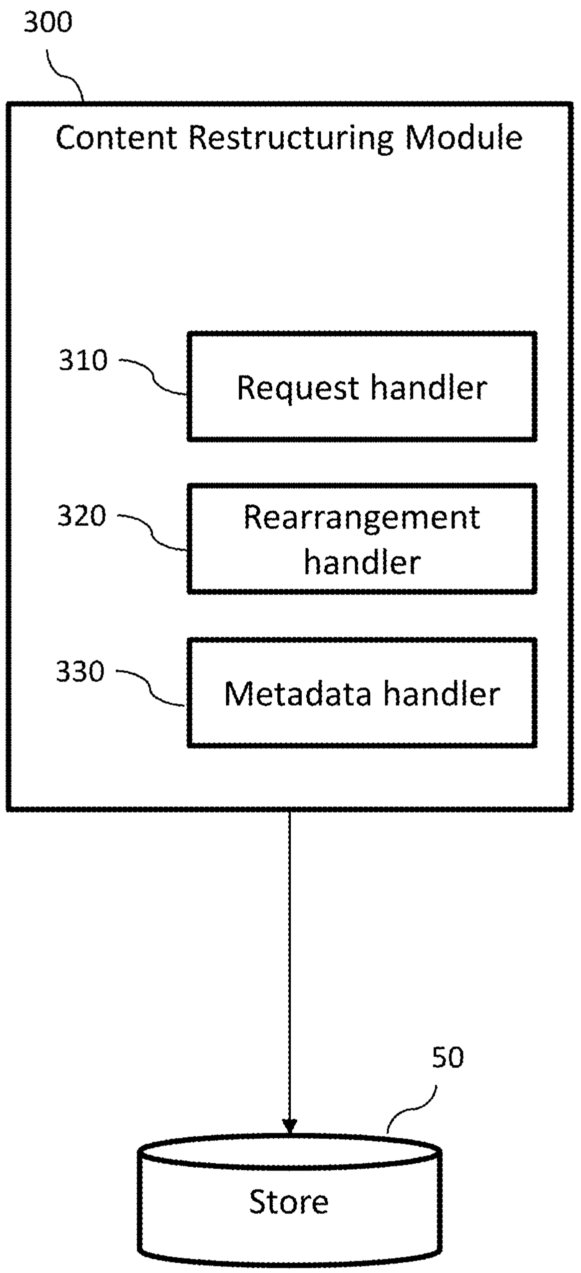
FIG. 3 is a schematic illustration of the content restructuring module of the SCDS constructed and operative in accordance with an embodiment of the present invention.

FIG. 3, to which reference is now made, is a schematic illustration of content restructuring module 300 constructed and operative in accordance with an embodiment of the present invention. Content restructuring module 300 comprises a request handler 310; a rearrangement handler 320; and a metadata handler 330.

Request handler 310 may receive a request to restructure a specific content located at a defined location to a form that supports a set of defined parameters. As indicated above, the parameters may include specific quality settings.

If the specific content already has a restructured form, request handler 310 may send the information related to the restructured form as a response. The presence of a restructured form of the needed content may be identified by the existence of a metadata file describing the restructured content (e.g., a manifest file).

If the specific content does not have a restructured form, content restructuring module 300 may activate rearrangement handler 320 to create a restructured form for the required content.

Rearrangement handler 320 may retrieve the original video file from store 50, decode it and create an image for each frame in the video file. The procedure of creating an image for each frame may start by splitting the video into a variable number of initial segments, with each segment optionally having a different size. Rearrangement handler 320 may use any known tool such as FFmpeg toolkit, Avidemux and Shotcut for decoding and splitting the video file.

Rearrangement handler 320 may proceed and concurrently perform the same processing steps on all segments. Rearrangement handler 320 may extract each frame in the segment and convert it to a predefined file format (e.g., web optimized image format-WebP), Rearrangement handler 320 may then adjust the resolution and store the image as a file in store 50 while preserving the sequence of frames. It is worth noting that the name of the file may indicate its location, thereby providing a mechanism to maintain the order of images while rendering them on display 60.

Rearrangement handler 320 may determine the number of the initial segments, and the size of each segment based on the characteristics of the original content (e.g., length), and the required quality parameters (e.g., FPS).

To enable the quick initiation of the playback, rearrangement handler 320 may split the initial parts of the content to segments smaller than those of the preceding parts which in turn enables providing the first set of images which form the initial parts of the video faster.

Metadata handler 330 may create a metadata file containing information related to the new structure of the content including the number of image files, their location and any relevant quality information (such as resolution and FPS) needed to support the playback of the images on display 60 simulating the standard playback of a video file.

Figure 4:
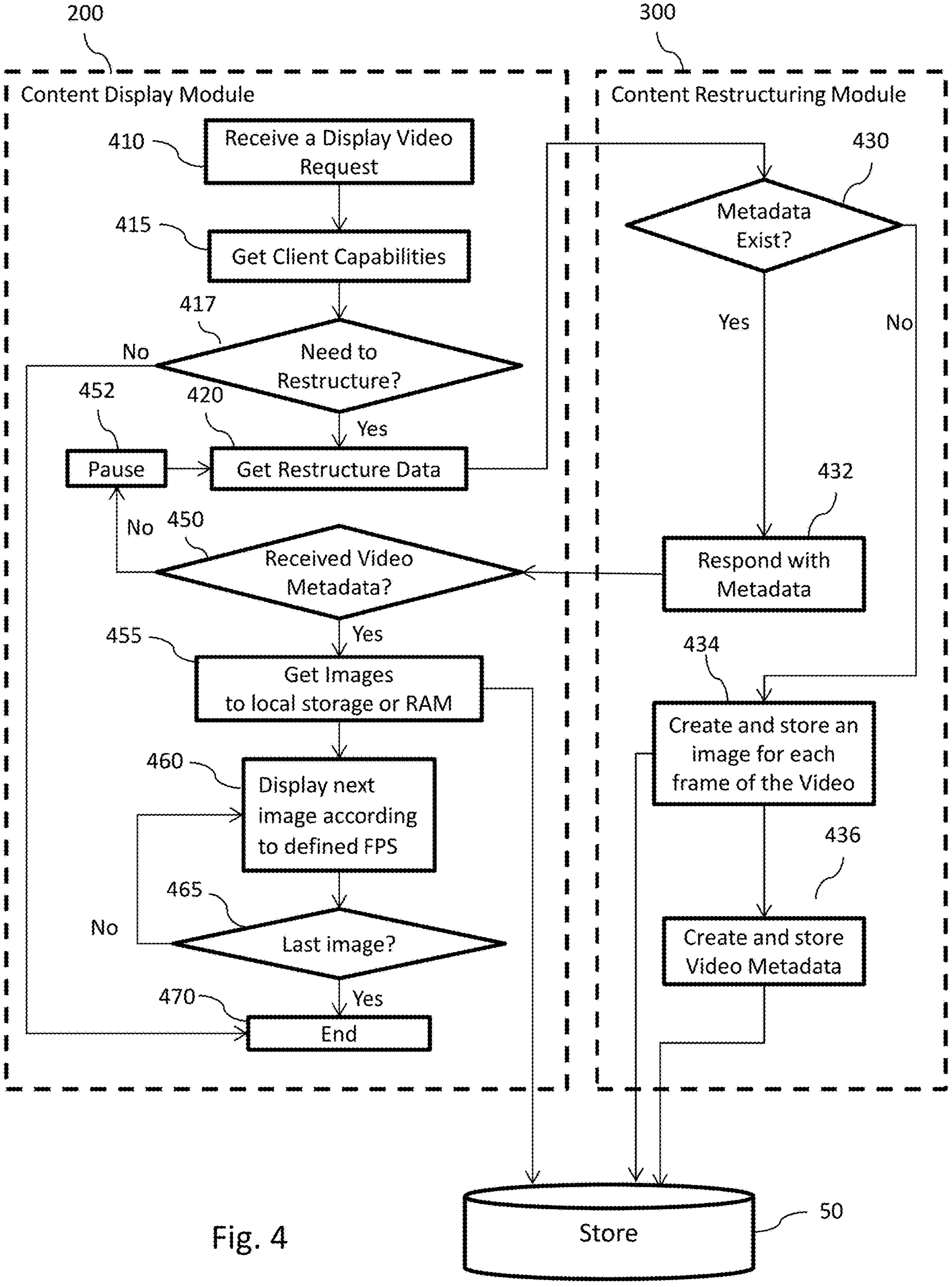
FIG. 4 is a schematic illustration of a flow performed by SCDS in accordance with an embodiment of the present invention.

FIG. 4, to which reference is now made, is a schematic illustration of a flow 400, constructed and operative in accordance with an embodiment of the present invention. Some steps of flow 400 may be implemented by content display module 200 and some other steps may be implemented by content restructuring module 300.

Flow 400 may start at step 410 when content display module 200 receives a request to display a video. The request may be created by a user (e.g., operating a remote control) or by the appliance client (e.g., a timer elapsed event). In step 415, content display module 200 may get the capabilities of the device and the application running on the appliance and determine in step 417 if the content needs to be restructured to play it properly. If the content can be played as-is flow 400 may end at step 470.

If the content cannot be played in its original format, flow 400 may continue to step 420 where content display module 200 may request to receive the restructured information (from content restructuring module 300) and wait for a response. It may be noted that the relevant information may be stored in a metadata file at store 50. At step 430, content restructuring module 300 may check if the restructured information exists (i.e., a restructuring procedure has been done before, and the images and the metadata file exist). If the restructured information exists, 400 may continue to step 432 and respond with the relevant information. If the restructured information does not exist flow 400 may continue to step 434 where content restructuring module 300 may create and store an image for each frame of the video and then flow 400 may continue to step 436 where content restructuring module 300 may create and store the video metadata file.

In step 450, content display module 200 may check if a response regarding the restructured information (e.g., a URL to a metadata file in store 50) was received in a timely manner. If not, content display module 200 may pause in step 452, and return to step 420 after the pause duration has elapsed.

If a response was received, flow 400 may continue to step 455 where content display module 200 may get the information related to the restructured form and the various image files, and after a configured percentage of the images has been downloaded flow 400 may continue to step 460 and start displaying the images one after the other at the predefined rate on display 60. In step 465 content display module 200 may check if the last image was rendered and displayed and if so, flow 400 may end at step 470, otherwise, content display module 200 may continue the get the next images from store 50 and display them on display 60.

Embodiments of the present invention provide a system and a method to display video files when standard video playback is not feasible. Standard video playback of a video file is not feasible, for example, when the client does not support the format of the requested content. It is also not feasible in cases when a concurrent display of multiple video files is not supported or when transparent animation is required on clients and applications that do not support this functionality.

It may be appreciated that the steps shown for the flows herein above are not intended to be limiting and that each flow may be practiced with variations. These variations may include more steps, less steps, changing the sequence of steps, skipping steps, among other variations which may be evident to one skilled in the art.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Unless specifically stated otherwise, as apparent from the following discussions, it is appreciated that throughout the specification discussions utilizing terms such as "analyzing", "processing," "computing," "calculating," "determining," "detecting", "identifying" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

What is claimed is:

1. A computer-implemented system for seamless content delivery to an appliance equipped with a screen, the system comprising:

at least one memory;

at least one processor communicatively coupled to the memory; and a seamless content delivery system (SCDS), operated by the at least one processor, the SCDS is configured to, receive a request to play a video on the screen, the video stored in a first format, wherein the appliance cannot display the video in the first format, restructure the video into a second format supported by the appliance, and play the video in the second format on the screen, wherein the SCDS further comprises a content display module configured to receive the request to play the video in the first format and play the video in the second format, and a content restructuring module configured to create the second format, and wherein the first format is a file stored in any standard video playback format and the second format comprises a plurality of images and a metadata file, wherein each image is a frame of the video and wherein the metadata file comprises information related to the images and to a plurality of quality parameters.

2. The system of claim 1 wherein the set of quality parameters includes any of a number of images, a location of the images, a resolution, frames per second (FPS), bitrate, codec, audio parameters, length, duration, aspect ratio, and color depth.

3. The system of claim 1 wherein the content display module further comprises:

a trigger handler configured to receive the request to play the video;

a capabilities handler configured to check the ability of the appliance to directly play the video;

a content retrieval handler configured to retrieve the second format of the video; and a content display handler configured to play the second format of the video at a required rate on the screen.

4. The system of claim 3 wherein the request is received upon activation by a manual event or an automatic event, wherein the manual event consists of any of: pausing a playback and changing a channel, and wherein the automatic event consists of any of: start playing the video, stop playing the video, and specific time elapsed from the beginning of the playback.

5. The system of claim 1 wherein the content restructuring module further comprises:

a request handler configured to receive a request to provide a second format for the video;

a rearrangement handler configured to decode the video and create image files from frames of the video; and a metadata handler configured to update the metadata file with details on the percentage of the images created related to the total number required.

6. The system of claim 5 wherein the rearrangement handler is configured to split the video into a variable number of variable sized initial segments and concurrently on all segments extract each frame in the segment and convert the extracted frame into an image with a predefined resolution and a predefined file format.

7. A computer-implemented method for seamless content delivery to an appliance equipped with a screen, the method comprising:

receiving a request to play a video on the appliance, the video stored in a first format, wherein the appliance cannot play the first format of the video;

restructuring the video into a second format, wherein the appliance can play the video in the second format; and playing the video in the second format on the appliance, wherein the first format is a file stored in any standard video playback format and the second format comprises a plurality of images and a metadata file, wherein each image is a frame of the video and wherein the metadata file comprises information related to the images and a set of quality parameters.

8. The method of claim 7 wherein the set of quality parameters includes any of a number of images, a location of the images, a resolution, frames per second (FPS), bitrate, codec, audio parameters, length, duration, aspect ratio, and color depth.

9. The method of claim 7 further comprising:
checking the ability of the appliance; and
if the appliance cannot play the video in the first format retrieving the second format of the video and playing the second format of the video on the screen according to the quality parameters.

10. The method of claim 7 wherein the restructuring step further comprises:
creating image files from frames of the video; and
continuously updating the metadata file with details on the percentage of the images created out of the total number of frames in the video.

11. The method of claim 10 wherein the step of creating image files further comprising:
splitting the video into a variable number of variable sized initial segments; and
concurrently on all segments, extract each frame in the segment and convert the extracted frame into an image with a predefined resolution and a predefined file format.

12. The method of claim 7
wherein the request is received upon activation by a manual event or an automatic event,
wherein the manual event consists of any of: pausing a playback and changing a channel, and
wherein the automatic event consists of any of: start playing video, stop playing video, and specific time elapsed from the beginning of the playback.

* * * * *